J. C. GREEN.
CANNING MACHINE.
APPLICATION FILED MAR. 13, 1919.
1,387,977.
Patented Aug. 16, 1921.
4 SHEETS—SHEET 1.
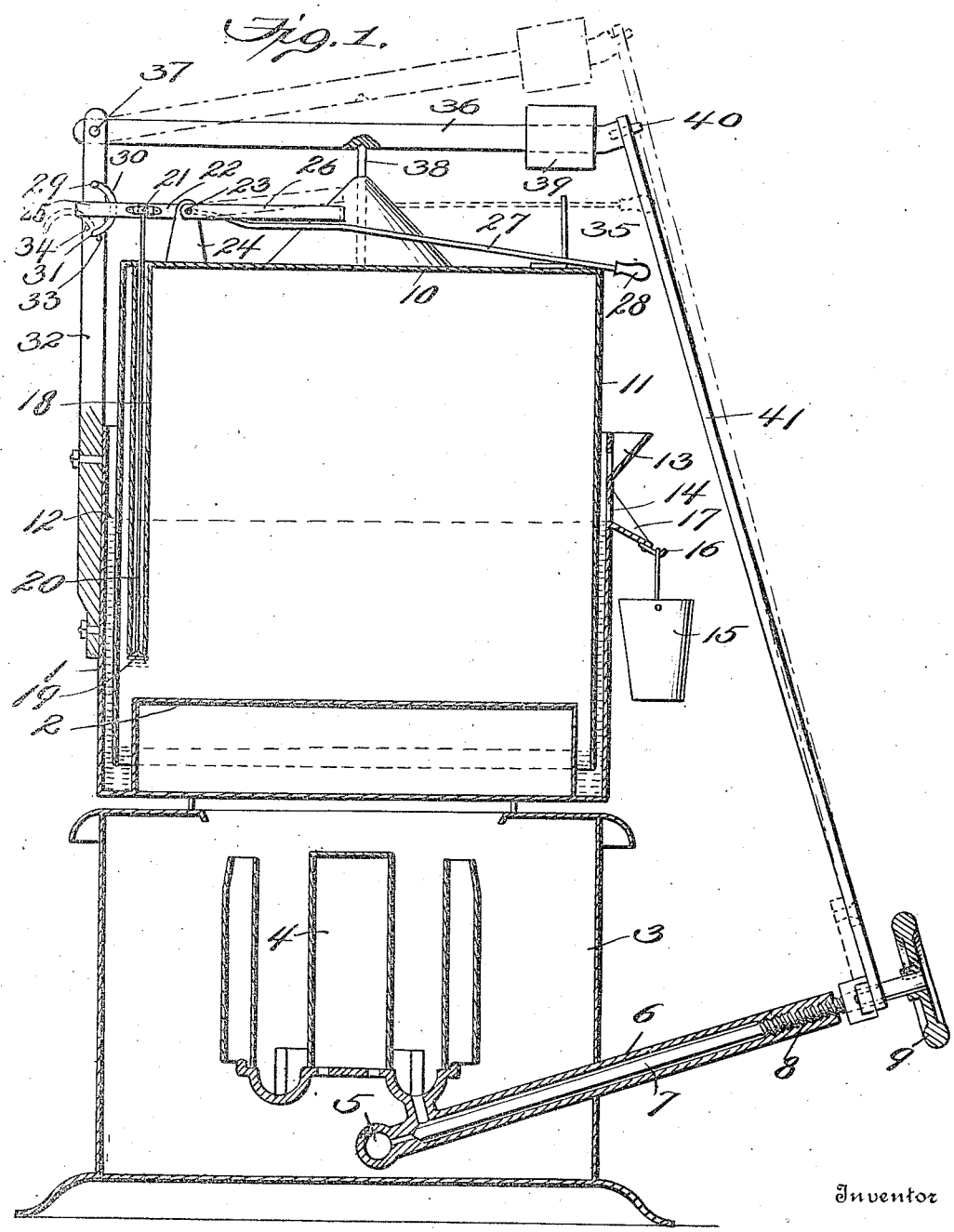
Witness
Inventor
John C. Green
By 
Attorney

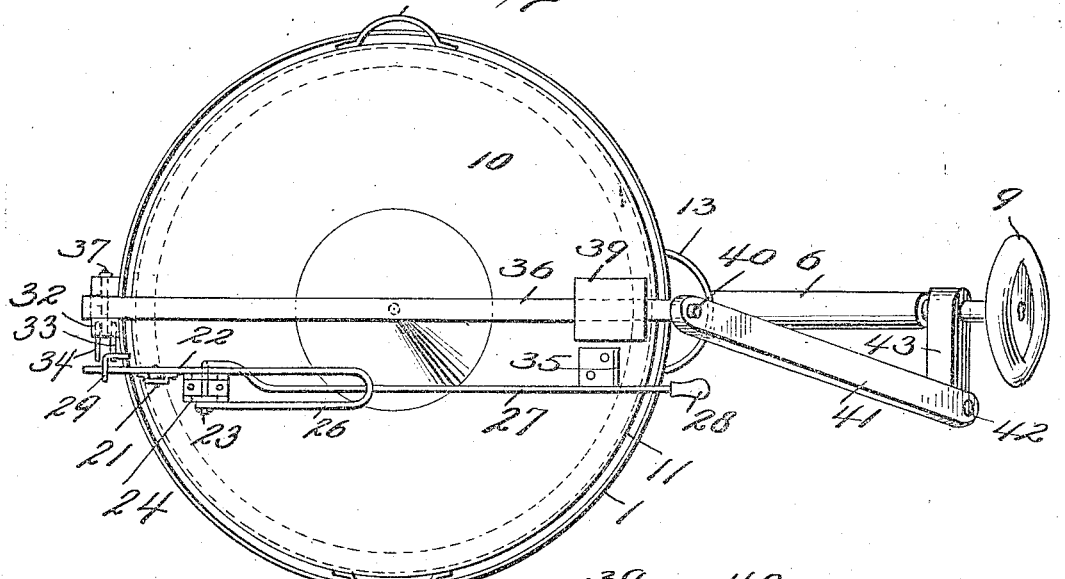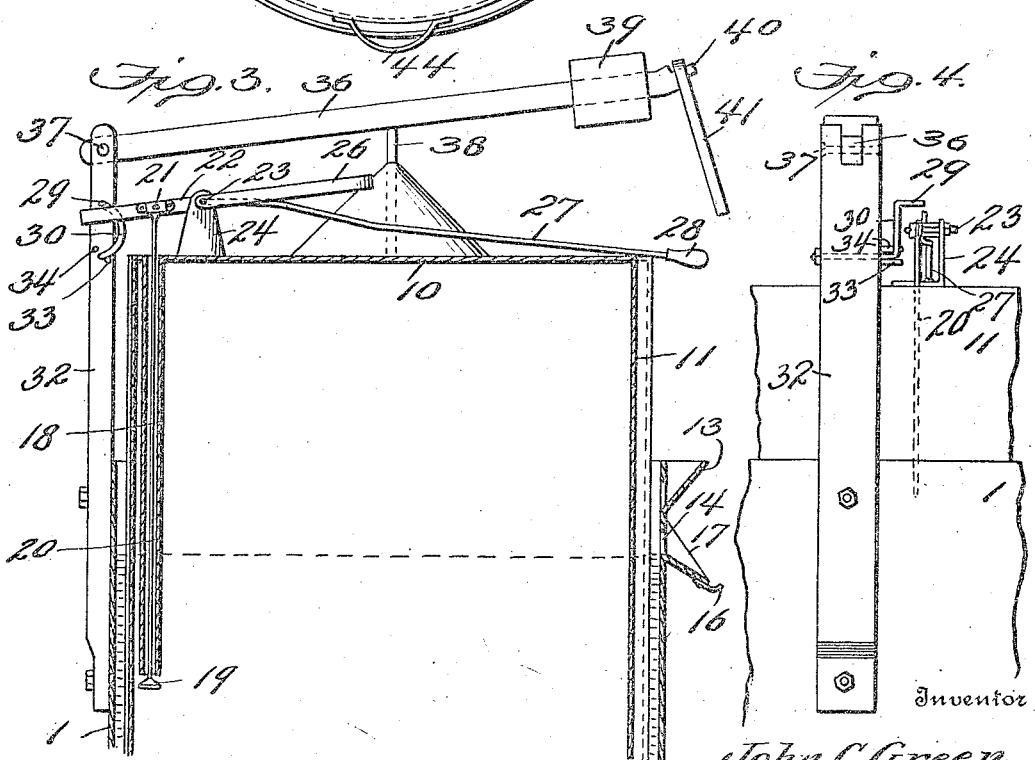

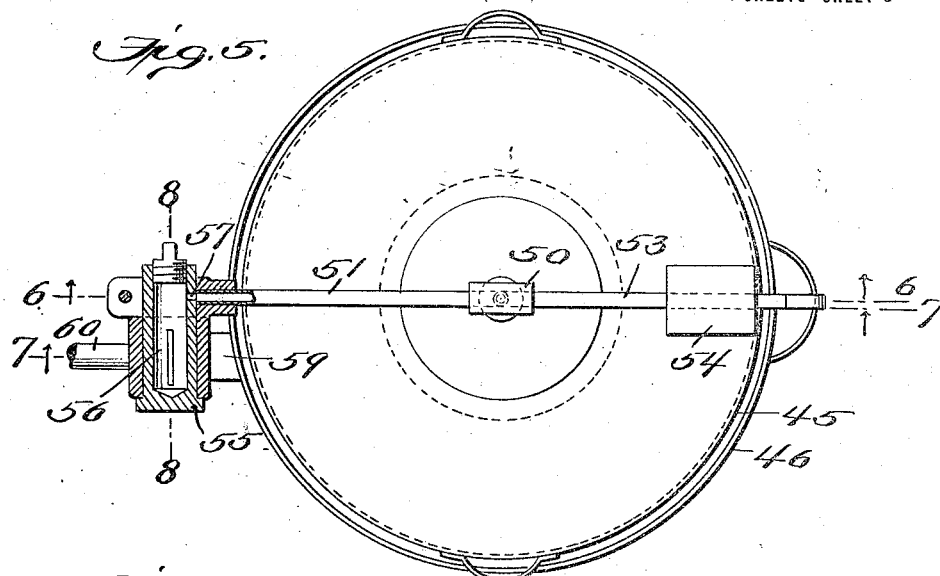
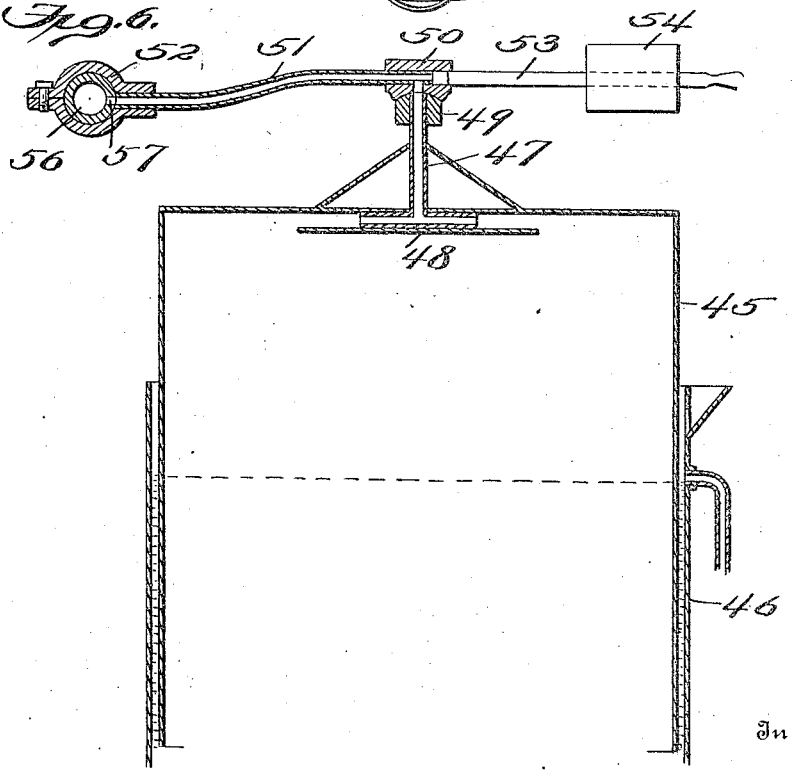

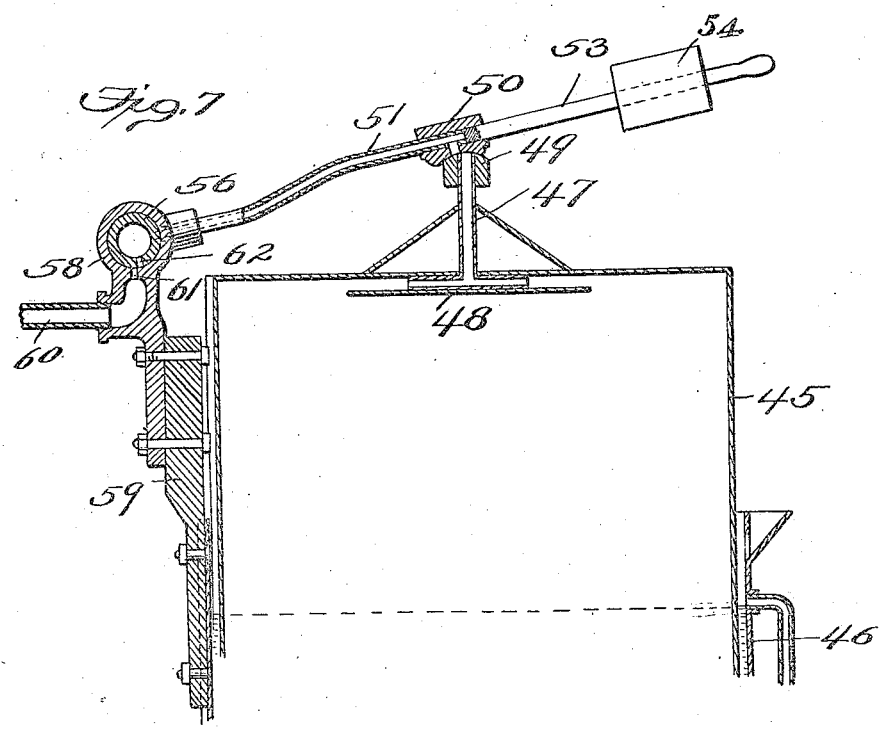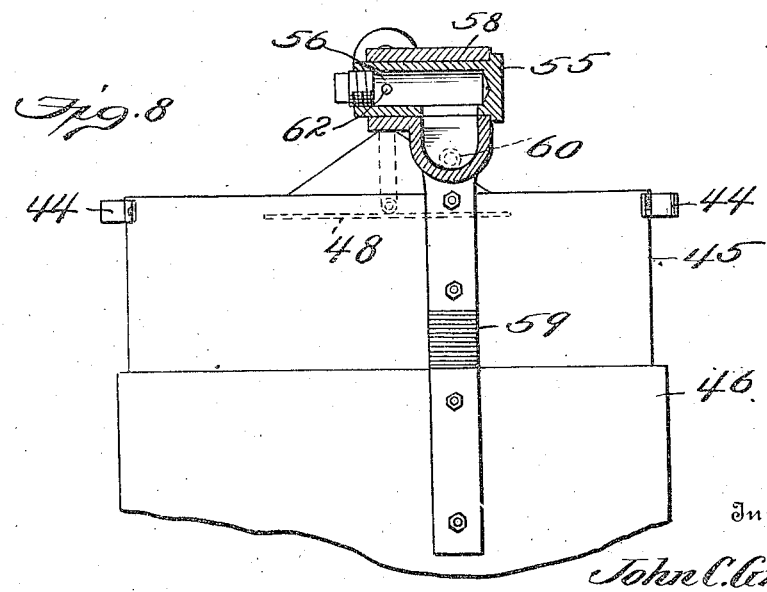

UNITED STATES PATENT OFFICE.

JOHN C. GREEN, OF HACKETTSTOWN, NEW JERSEY.

CANNING-MACHINE.

1,387,977.  Specification of Letters Patent.  Patented Aug. 16, 1921.

Application filed March 13, 1919. Serial No. 282,389.

*To all whom it may concern:*

Be it known that I, JOHN C. GREEN, a citizen of the United States, residing at Hackettstown, in the county of Warren and State of New Jersey, have invented new and useful Improvements in Canning-Machines, of which the following is a specification.

My present invention relates to improvements in canning machines and the primary object thereof is to provide a novel and improved machine of this character whereby the proper temperature for obtaining the best results in the processing or canning of fruits, vegetables and the like is maintained automatically, the manipulation of the machine may be accomplished with facility requiring but little attention on the part of the operator, and the general construction and operation of the machine is improved to the end that the best efficiency may be attained and the best quality of canned products may be obtained.

To these and other ends the invention consists in certain improvements and combinations and arrangements of parts, all as will be hereinafter more fully described, the features of novelty being pointed out particularly in the claims at the end of the specification.
In the drawings—

Figure 1 represents a central vertical section through a canning machine constructed in accordance with one embodiment of my invention.
Fig. 2 is a top plan view of the machine as shown in Fig. 1.

Fig. 3 represents a central vertical section through the upper portion of the machine shown in Fig. 1, showing the relative position of the temperature regulating elements when the cover of the machine is elevated.

Fig. 4 is a side elevation of the upper portion of the machine as viewed from the left in Fig. 3.
Fig. 5 is a top plan view partly in section of a canning machine constructed in accordance with another embodiment of the invention.

Fig. 6 represents a vertical section of the upper portion of the machine taken on the line 6—6 of Fig. 5.

Fig. 7 represents a vertical section through the upper portion of the machine taken on the line 7—7 of Fig. 5, and Fig. 8 is an elevation of the upper portion of the machine shown in Fig. 5, the same being partly in section on the line 8—8 of Fig. 5.

Similar parts are represented by the same reference characters in the several views.

The present invention provides improvements in canning machines whereby the temperature to which the products in process of canning are subjected is maintained automatically at the proper degree. The invention is especially applicable to canning machines of the type known as water-seal canners which comprise, generally speaking, a tank containing water and a flanged or dome-shaped cover which incloses the products to be treated, the peripheral edge of the cover being submerged in the water in the tank, and the interior of the cover providing a chamber which contains the heating medium. Two embodiments of the invention are shown in the accompanying drawing and will be hereinafter described in detail. It is to be understood, however, that the invention is not restricted to the precise constructions shown, as equivalent constructions are contemplated and will be included within the scope of the claims.

In the embodiment of the invention shown in Figs. 1 to 4 inclusive, the machine comprises a tank 1 which may be cylindrical in form and open at the top, this tank having preferably a false bottom 2 therein which is adapted to serve as a support for the cans, jars or other containers of the products to be treated. The tank in this instance is heated by a stove 3, the stove shown having a burner 4 which receives fuel oil from an oil supply pipe 5, the amount of oil supplied to the burner, and in consequence the heat generated by the burner, being controlled by a valve 6, the valve stem 7 of which is threaded at 8 into the valve casing. The outer end of the valve stem has a hand wheel 9 by which the valve may be opened and closed manually for starting and cutting off the burner. This valve may be of any of the types commonly used on oil stoves which open and close by rotary movements of their stems. The tank 1 is provided with a cover 10 which, as shown, has a downwardly extending flange 11 which is somewhat smaller than the tank 1 and is adapted to move vertically therein. The tank 1 is adapted to contain water up to the level indicated at 12, the cover floating in this water due to the submergence of its flange 11 therein. The tank may be provided with a spout 13 to facilitate the filling of the tank up to the proper level with water and in order to limit the level of the water in the tank an overflow vent 14 may be provided in its side wall. A pail 15 may be provided to collect water overflowing from the vent 14, the pail being shown suspended from a hook 16 attached to a spout 17 leading from the overflow vent. The cover 10 is closed at its top except for a pipe or tube 18 which extends from an opening through the top of the cover downwardly to a point near the lower peripheral edge of the cover. The lower end of this pipe or tube provides a seat for a valve 19, said valve having a stem 20 which extends upwardly through the pipe or tube and is pivotally connected at 21 to a lever 22. This lever is pivoted at 23 to a lug or bracket 24, the latter being fixed on or attached to the top of the cover. This lever 22 has an outwardly extending arm 25 at one side of its pivot and it is doubled to form a U-shaped arm 26 at the opposite side of its pivot. The pivot 23 for the lever 22 is preferably formed by the laterally bent end of a rod 27, this rod being bent so as to underlie the U-shaped portion 26 of the lever 22 and extended across the top of the cover, it being provided at its extremity with a handle 28. The valve 19 serves to vent cold air from the interior of the cover when the machine is started into operation and it also serves as a safety valve to control the amount of pressure within the cover. According to the present invention the operation of this valve to perform these functions is controlled automatically by means which coöperates with the valve controlling lever 22. As shown such means comprises a stop 29 which is formed at the laterally bent end of a link or crank 30, the latter being pivoted at 31 to an upwardly projecting bracket or arm 32, the latter being bolted or otherwise fixed to the tank 1. A stop pin 33 is fixed to the arm 32 at one side of the pivot of the link or crank 30, this pin serving to support the crank or link 30 in its upright position, as shown in full lines in Fig. 1, so that the laterally bent portion 29 overlies the arm 25 of the lever 22, and a second stop pin 34 may be provided at the opposite side of the pivot 31 of the crank or link 30, this latter stop pin serving to support the crank or link 30 when the latter is swung into the inoperative position indicated by the dotted lines in Fig. 1. The crank or link 30 during the operation of the machine occupies the upright or full line position shown in Fig. 1, it being swung to the dotted line position so as to clear the arm 25 of the lever 22 only when the cover 10 is to be removed from the tank. The rod 27 provides manual means for opening the valve 19 when such is desirable or necessary. In some cases it may be desirable to hold the valve in open position. For this purpose a bracket 35 may be fixed to the top of the cover 10 in such a position that a vertical edge of this bracket will bind frictionally against one side of the rod 27, thus holding the rod 27 in any position where it may be set.

The regulating of the temperature of steam within the cover is effected, in this embodiment of the invention, by a lever 36 which is pivoted at 37 to the bracket or arm 32 and which is engaged at an intermediate point by a stud 38 which is fixed to the top of the cover, the opposite end of the lever carrying a weight 39 and also bearing a projection 40 which is operatively connected to the upper end of a link 41, the lower end of this link being pivotally connected at 42 to an actuating arm or crank 43 fixed to the valve stem 7. When the cover 10 rises, owing to an increase in the pressure of the steam contained in the chamber formed by the cover, the stud 38 acts on the lever 36, raising it from the full line position shown in Fig. 1 toward the dotted line position shown in that figure. This upward movement of the lever 36 swings the arm or crank 43, thereby rotating the valve stem 7 in a direction to reduce the amount of fuel oil flowing to the burner. In consequence the amount of heat generated by the burner will be reduced until the desired operating temperature has been reached. Conversely a reduction in the pressure of the steam contained in the cover 10 will allow descent of the cover and the corresponding descent of the lever 36 will act through the link 41 and the crank or arm 43 to rotate or otherwise actuate the valve 7 in a direction to increase the flow of fuel to the burner. It follows that an equilibrium will be established automatically between the elevation of the cover and the burner which supplies the heat, this equilibrium being determined by the steam pressure and in consequence the temperature at which the machine is set to operate. The operating pressure and temperature may be set at different predetermined points by shifting the weight 39 along the lever 36 or by substituting a lighter or a heavier weight for the weight 39. It will be understood that the initial rising of the cover 10, due to the generation of steam beneath the cover will bring the arm 25 of the lever 22 into engagement with the stop 29, the further rise of the cover causing the lever 22 to be tilted into the position shown in Fig. 3, thus opening the valve 19 and venting the cold air contained beneath or within the cover. Also, should a steam pressure in excess of that desired be developed within the cover, the rising of the cover in consequence thereof will open the valve 19, thus permitting the excess pressure to escape. Whenever the cover descends to its normal operating level the arm 25 of the lever 22 recedes from the stop 29 in consequence of which the valve 19 closes, it being understood that the doubled or U-shaped portion 26 of the lever 22 provides a counterweight for this lever, which acts to close the valve 19 and to retain it in closed position except when it is opened by the stop 29 or by the rod 27. The valve 19 is capable of acting very efficiently to regulate the pressure of steam within the cover, as it is actuated in response to the rising and descending movements of the cover, the cover presenting a large surface to the pressure of steam within it. The valve therefore will be sensitive to slight variations in the pressure of the steam, enabling a close regulation of the steam pressure to be attained.

The cover 10 may be provided with handles 44 to facilitate its removal from the tank, removal of the cover being effected easily after the link 41 has been disengaged from the pin 40, the crank or link 30 has been swung to the dotted line position shown in Fig. 1 and the lever 36 has been swung back about its pivot 37.

In the embodiment of the invention shown in Figures 5 to 8 inclusive, the tank and cover are similar to those shown in Figs. 1 to 4 inclusive. In this embodiment of the invention, however, the heating medium in the form of steam is generated outside of the tank and is conducted thereto. As shown, the cover 45 fits into the tank 46, the top of the cover being provided with a tubular bracket 47 through which the steam is admitted to the interior chamber of the cover, a steam distributing plate 48 being provided to spread the steam as it enters the cover. The upper end of the bracket 47 is provided with a spherical head 49 adapted to coöperate with a fitting 50, this fitting being carried by a lever 51, one end of which is tubular and is fixed to a clamp 52 and the opposite end 53 of which may be solid and provided with a weight 54. The clamp 52 encircles a valve plug 55 which has an interior passage 56 and a radial passage 57 which communicates with the tubular bore of the lever 51. The valve plug 55 is rotatably fitted in a valve casing 58, the latter being fixed to an arm 59, which latter is fixed to the tank 46. This valve casing is connected by a pipe 60 to a suitable source of steam supply and the casing has a steam inlet port 61 arranged to coöperate with a radial port 62 formed in the valve plug 56. With this arrangement, when the cover is in its lower position, the lever 51 will be level, or approximately so, and the valve plug 56 will be in a position where its port 62 registers with the steam admission port 61 of the valve casing. Steam may then enter the cover through the valve, the tubular bore of the lever 51 and the tubular bracket 47 on the cover. When the steam pressure within the cover reaches a predetermined point the cover will rise to a point where the port 62 in the valve plug 55 is out of register with the steam admission port 61 in the valve casing 58, the supply of steam to the cover being thereby cut off. In operation an equilibrium will be established between the pressure of the steam and the control valve in consequence of which the temperature within the cover and to which the products under treatment are subjected will be maintained constant. An adjustable weight 54 may be provided on the lever 53 by adjustment of which the operating pressure and consequent temperature may be increased or reduced. It is to be understood that the dome-shaped cover in this embodiment of the invention is immersed or floats in water contained in the tank, as is the case in the embodiment of the invention shown in Figs. 1 to 4 inclusive.

In both embodiments of the invention, as herein shown, the automatic regulation of the temperature at which the machine operates is effected by controlling the supply of the heating medium to the machine in accordance with the rising and falling movements of the dome or bell-like cover, the rising and falling movements of the cover being in response to the rising and falling steam pressure within the cover. Inasmuch as the supply of the heating medium will be increased or diminished immediately upon a downward or an upward movement of the cover, it is evident that the regulation of the steam pressure will be a close one, and in view of the fact that the temperature within the cover will be in accordance with the steam pressure therein, the temperature to which the fruits, vegetables or other products under treatment therein are subjected, will be maintained constant or substantially so. It will be understood that any surplus water in the tank will overflow through the overflow vent when the water rises above a predetermined level, and such overflow may be collected in the pail as shown in Fig. 1 or it may be carried off by an overflow pipe as shown in Figs. 6 and 7. This arrangement is particularly advantageous in cases where the heating medium in the form of steam is generated in a separate boiler and conducted to the canning machine, as in Figs. 5 to 8 inclusive, as the steam utilized in the canning machine becomes condensed therein, thus creating a surplus amount of water in the tank. This surplus water is taken care of by the overflow arrangements provided without requiring the attention of the operator.

I claim as my invention—

1. In a canning machine of the water-seal type, in combination, a tank to contain water and having an overflow for limiting the height of said water in the tank, a cover to be immersed in said water and capable of rising and lowering in response to variations in steam pressure within the cover, means for controlling the amount of heat supplied to the machine in accordance with such rising and lowering movement of the cover, said means including a lever pivoted at one end to a fixed pivot and extending over and bearing on said cover, and means acting on the free end of said lever and adjustable to regulate the pressure exerted by said lever on the cover to vary the amount of heat supplied to the machine independently of the control of the supply of heat by said controlling means.

2. In a canning machine of the water-seal type comprising a tank and a cover providing a chamber capable of rising and lowering therein in response to variations in steam pressure within the cover, means governed by said rising and lowering movements of the cover for controlling the supply of heat to the machine, and means independent of the heat-controlling means and operative in consequence of said movements of the cover to release or retain pressure therein when the cover rises above or falls below a predetermined height.

3. In a canning machine of the type comprising a tank and a cover providing a chamber adapted to contain steam and the products to be treated and capable of rising and lowering movements in accordance with variations of the steam pressure therein, means operative by the rising and lowering movements of said cover for controlling the supply of heat to the machine to maintain a steam pressure within the cover, and other means also operative by the rising and lowering movements of said cover to automatically release or interrupt the release of pressure within the cover.

4. A canning machine of the water-seal type comprising a tank and a cover providing a chamber capable of rising and lowering therein in response to variations in steam pressure within the cover, said cover having a vent, a valve controlled by said movements of the cover to open and close said vent, and manually-controlled means operative independently of the movements of the cover for actuating said valve to open and close said vent.

5. In a canning machine of the type comprising a tank and a cover capable of rising and lowering movements therein and providing a chamber to contain steam and also the products to be treated, means for venting cold air from within said cover when starting the machine, a lever operative by the rising and lowering movements of said cover, and means operatively connecting said lever to said venting means to actuate the latter, in accordance with the said movements of the cover.

6. In a canning machine of the water seal type comprising a tank and a cover capable of rising and lowering movements therein, in response to variations in steam pressure within the cover, means for controlling the steam pressure within the cover embodying a valve on which the steam pressure within the cover acts directly with a tendency to maintain the valve in closed position, and means connecting said valve to said cover to cause opening of the valve when the cover rises above a predetermined height.

7. In a canning machine having a cover providing a chamber capable of rising and lowering movements in response to variations in steam pressure therein, and a safety valve controlled by such rising and lowering movements of the cover to limit the steam pressure therein, means for operating said valve comprising a lever movable by the cover and operative upon the valve, and a pin to coöperate with said lever to cause the latter to open the valve, said pin being movable, at the will of the operator, into operative or inoperative position relatively to said lever, and capable of being maintained by gravity in either of said positions.

8. In a canning machine, having a cover adapted to contain steam, and a safety valve for limiting the pressure of steam in the cover, means for actuating said valve by rising and lowering movements of the cover in response to variations in the pressure of steam within the cover, such means comprising a lever composed of a rod pivoted intermediately and having one end doubled to provide a weight at one side of its pivot which weight is sufficient to counterbalance the other end of the lever and the valve which is connected to it.

9. In a canning machine having a cover adapted to contain steam, and a safety valve for limiting the pressure of steam in the cover, means for actuating said valve by rising and lowering movements of the cover in response to variations in the pressure of steam within the cover, such means comprising a lever composed of a rod having one end doubled to provide a weight at one end of the lever that will counterbalance the other end of the lever and the valve connected to it, the pivot of the lever having bearings on the two arms of the doubled portion.

In testimony whereof I have hereunto set my hand in presence of two subscribing witnesses.

JOHN C. GREEN.

Witnesses:
HARRY E. MATTISON,
CHARLES JOHNSTON.